United States Patent [19]

Panicci

[11] Patent Number: 4,606,348
[45] Date of Patent: Aug. 19, 1986

[54] CLOSURE BEAD

[75] Inventor: Richard L. Panicci, Hanover, Mass.

[73] Assignee: Kiddie Products, Inc., Avon, Mass.

[21] Appl. No.: 564,518

[22] Filed: Dec. 22, 1983

[51] Int. Cl.⁴ .............................................. A61J 17/00
[52] U.S. Cl. .................................... 128/359; 24/122.6
[58] Field of Search ............. 24/122.6, 16 PB, 17 PB, 24/128 R, 122.6; 40/21, 21 C; 119/126; 128/359

[56] References Cited

U.S. PATENT DOCUMENTS

| | | |
|---|---|---|
| 655,155 | 7/1900 | Littlepage . |
| 1,229,855 | 6/1917 | Alexander . |
| 1,413,690 | 4/1922 | Slocum ........................ 24/122.6 X |
| 2,309,741 | 2/1943 | Woodward . |
| 2,651,671 | 9/1953 | Lanfear ........................ 24/122.6 X |
| 4,049,357 | 9/1977 | Hamisch . |
| 4,117,998 | 10/1978 | Notoya . |
| 4,177,542 | 12/1979 | Denney ........................ 24/122.6 X |
| 4,311,149 | 1/1982 | Panicci . |

*Primary Examiner*—Robert Peshock
*Assistant Examiner*—Wenceslao J. Contreras

[57] ABSTRACT

A string closure which comprises two body members joined together to define a central cavity for encapsulating portions of the string and openings at either end defining a longitudinal axis. A pair of walls adjacent at least one opening extends transverse to the axis, and those walls are spaced axially from each other a distance which is less than the diameter of the string and which is sufficiently small to squeeze the string therebetween to prevent separation of the string and closure. The walls extend from opposite body members.

17 Claims, 12 Drawing Figures

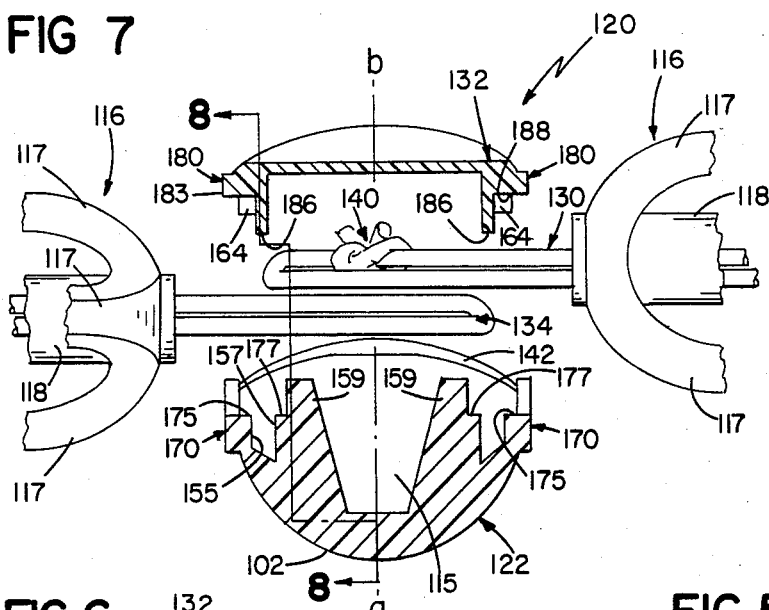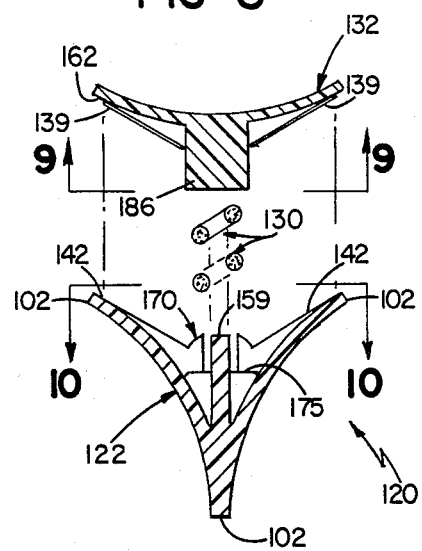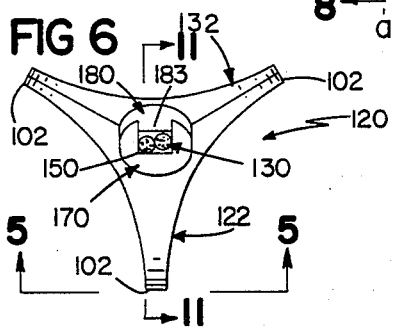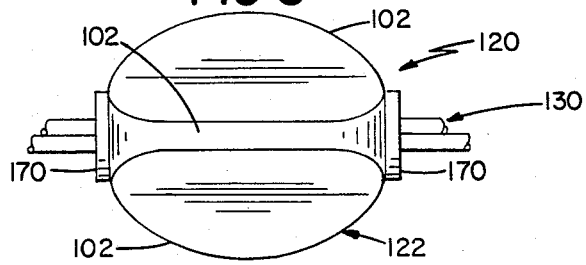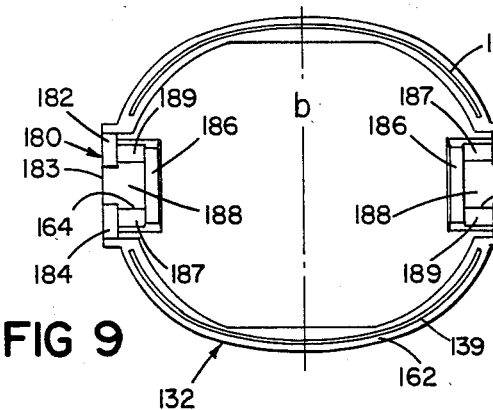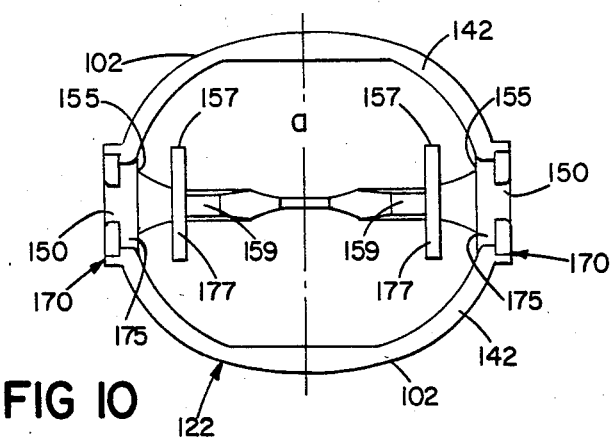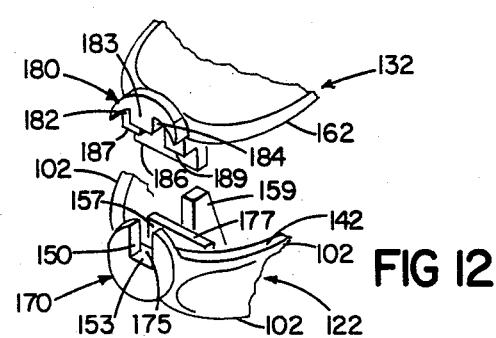

CLOSURE BEAD

BACKGROUND OF THE INVENTION

This invention relates to closures adapted to join and hold opposite ends of strings such as a string used for children's teething beads.

Teething beads may be linked together by threads, the ends of which are knotted. If the beads become separated from the thread, or if the thread is broken, as would happen for example if the knot or thread were to fail, beads or pieces may separate and be ingested by the user. The resulting injuries can be very serious, and there is thus a need for an improved securing system.

SUMMARY OF THE INVENTION

The invention features a string closure which comprises two body members joined together to define a central cavity for encapsulating portions of the string and openings at either end defining a longitudinal axis. A pair of walls adjacent at least one opening extends transverse to the axis, and those walls are spaced axially from each other a distance which is less than the diameter of the string and which is sufficiently small to squeeze the string therebetween to prevent separation of the string and closure. The walls extend from opposite body members.

In preferred embodiments, the string ends are joined in a knot which is encapsulated in the cavity. There is a pair of walls adjacent each opening; each pair includes a first wall adjacent the opening and a second wall spaced axially inward of the first wall; and either both first walls extend from the same body member, in which case both second walls extend from the other body member, or the first walls extend from different body members, in which case the second walls also extend from different body members. One wall of each pair of walls may be slotted to form a guide for the string. A plurality of beads or decorative shapes are strung along the string; and at least two strands of string extend through each shape on the string. Each closure body member entirely defines an opening to the closure bead cavity, so that even if the closure body members separate, each body member will be held on the strands. In one embodiment, the string is a continuous loop formed by a knot in a linear string which has been folded in half and flatted to create two end loops, and each loop extends through a closure bead opening; there are two posts in the closure bead cavity, and each loop is fixed around the post furthest from the opening through which it enters the cavity.

The resulting closure securely squeezes on the string at multiple points with sufficient force to prevent separation of the string from the closure bead in normal use.

Other features and advantages of the invention will be apparent from the following description of the preferred embodiments, taken together with the accompanying drawings, and from the claims.

DESCRIPTION OF THE PREFERRED EMBODIMENTS

We turn now to the structure and operation of the preferred embodiments, first briefly describing the drawings thereof.

I. Drawings

FIG. 5 is a side view of a second embodiment of a closure bead, assembled along 5—5 of FIG. 6.

FIG. 6 is an end view of the bead of FIG. 5.

FIG. 7 is an exploded diagrammatic view of the bead illustrated in FIG. 5, partly in section, together with portions of adjacent beads.

FIG. 8 is a sectional view taken along 8—8 of FIG. 7.

FIG. 9 is a sectional view taken along 9—9 of FIG. 8.

FIG. 10 is a sectional view taken along 10—10 of FIG. 8.

FIG. 11 is a cross-sectional view of the closure bead taken along 11—11 of FIG. 6.

FIG. 12 is an exploded, isometric view of the endwall of the second embodiment.

II. Structure

Figure 1:
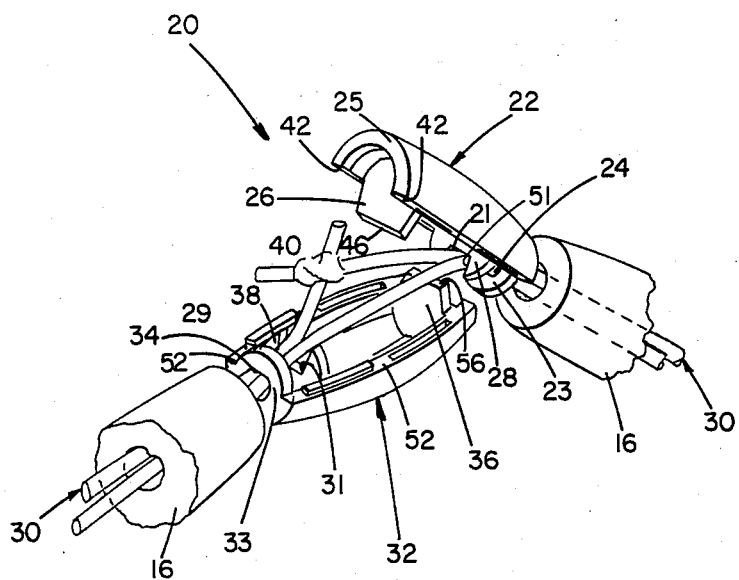
FIG. 1 is a view, with parts separated, of one embodiment of a closure bead according to the invention together with portions of adjacent beads.
Figure 2:
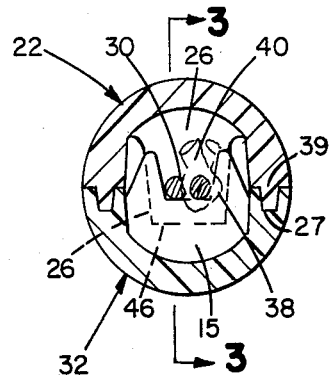
FIG. 2 is a sectional view of an assembled closure bead taken along 2—2 of FIG. 3.
Figure 3:
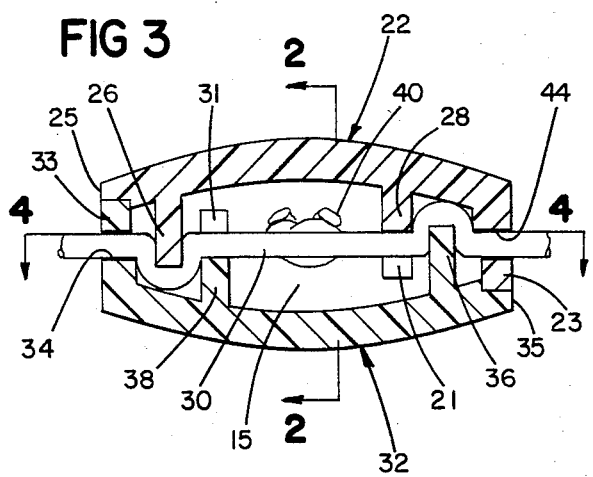
FIG. 3 is a sectional view taken along 3—3 of FIG. 2.
Figure 4:
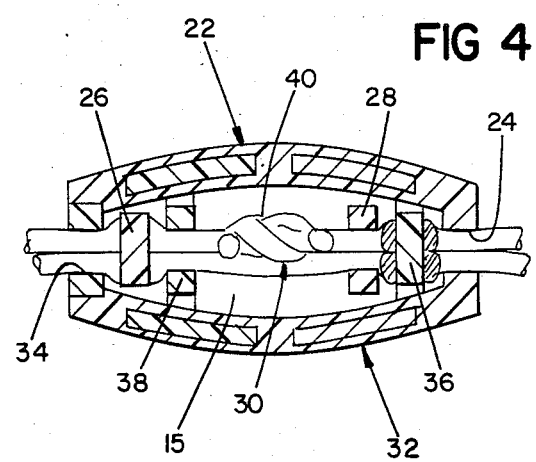
FIG. 4 is a sectional view taken along 4—4 of FIG. 3.

FIGS. 1–4 illustrate an ovoid hollow closure bead 20, resembling other beads 16 on the string 30, having a generally circular cross-section (perpendicular to the axis of string 30) when assembled. Closure bead 20 is formed of two bead sections 22, 32, which, when assembled, define a central cavity 15. In the illustrated embodiment, sections 22, 32 are identical mating halves.

Section 22 is discussed first. Section 22 has a longitudinal axis from one end thereof to the other. At one end of section 22 is an endwall 23 with an aperture 24 sized to accomodate at least two diameters of string 30. Endwall 23 extends generally perpendicular to the longitudinal axis of the section. At the end of section 22 opposite endwall 23 is an annular curved end 25, which forms the other longitudinal terminus of section 22, and is also generally perpendicular to the axis of bead 20. A first interior transverse wall 26 extends from the inner surface of section 22 generally perpendicular to the axis of the section, adjacent curved end 25. A second interior transverse wall 28 extends from the inner surface of section 22 generally perpendicular to the axis of the section, adjacent endwall 23. Walls 26 and 38 are generally parallel, generally planar walls which intersect the axis of bead 20. Wall 28 includes a notch or channel 21 sized to receive two diameters of string 30. The base of channel 21 is essentially coplanar with the base of aperture 24.

Section 32 is identical to section 22, having endwall 33, end 35 and interior walls 36 and 38, corresponding respectively to endwall 23, end 25 and interior walls 26 and 28; section 32 also includes an aperture 34 with a base co-planar with the base of channel 31 in wall 38.

Section 22 has two rims 42 extending longitudinally along opposite sides of the section. Along each rim 42 is one trough 27 and one ridge 29. Those troughs and ridges are cooperatively sized and positioned, so that when section 32 (which has identical corresponding ridges 39 and troughs 37) is positioned with its endwall 33 adjacent annular curved end 25, and with its longitudinal rims 52 butted against rims 42, each ridge 29 fits into a trough 37 and each ridge 39 fits in a trough 27.

When so positioned, sections 22 and 32 mate to form a hollow generally cylindrical member.

The transverse walls 36 and 26 are positioned adjacent curved endwalls 23 and 33 respectively and are spaced longitudinally within sections 22 and 32 such that, when bead 20 is assembled, wall 36 is interposed between channel wall 28 and endwall 23 and wall 26 is interposed between channel wall 38 and endwall 33. Thus, each of the two strands of string 30 extending through aperture 24, channel wall notch 21, channel wall notch 31, and aperture 34, is forced from a straight path through central cavity 15 of bead 20 and squeezed by the walls.

Specifically, the space between wall 36 and wall 28 is sufficiently less than the diameter of the string that the string is squeezed between the walls to prevent separation of the string and closure in normal use. The degree of separating force encountered in normal use, and thus the degree of squeezing required, will depend upon the use intended for the string. Where the string is used to support toys, such as beads or charms for a young child, the closure should withstand at least about 13-15 pounds of pull on the string or such other force limit as is prescribed by regulation, for example of the United States Consumer Product Safety Commission. The degree of squeezing force will also depend upon the nature of the string. For example, an ordinary fibre string will readily compress to a critical point of about one-third to one-half of its diameter. A considerable force is required to effect additional compression. Such a string should be squeezed to that critical point to enable an effective gripping of the string. For a string of braded nylon 0.060 inches in diameter, the clearance between walls 28 and 36 is preferably about 0.020 inches or 1.5 mm.

The spaces between wall 33 and wall 26, between wall 26 and wall 28, and between wall 36 and wall 23 are each, respectively, less than the diameter of string 30 to squeeze string 30 as described above.

A second embodiment of a closure bead 120 is shown in FIGS. 5-12. In FIG. 5, closure bead 120 is a generally ovoid body whose outer surfaces include three concave identations—arranged to form three ridges 102 at the intersections of the curved indentation surfaces. Ridges 102 are equally spaced from one another and bead 120 has a longitudinal axis parallel to ridges 102, extending from an opening at one end thereof to an opening at the other end thereof.

The closure bead 120 may be used to close a string of similarly shaped teething shapes 116 (FIG. 7) on a string 130. For example the teething shapes may have three triangularly-sectioned arms 117 attached to the beginning and end of a central string-carrying tube 118.

As shown in FIGS. 7 and 9, bead sections 122 and 132 are symmetric about planes a and b bisecting their respective longitudinal axes, so that the halves of sections 122, 132 formed by those bisecting planes are, respectively, mirror images of each other.

Turning first to female section 122, as best seen in FIG. 12, an endwall 170 extends from each end of the female bead section 122. Endwall 170 has channel 150, sized to receive two diameters of string 130.

As shown in FIGS. 5 and 10, transverse wall 155 is positioned toward the interior of bead section 122 from endwall 170. As best seen in FIGS. 10 and 11, the top 175 of wall 155 is coplanar with the base of channel 150. Spaced further within section 122 is interior transverse wall 157, the top 177 of which is also coplanar with the top 175 of wall 155. Spaced further axially within section 122 from wall 157, a flat wedge-shaped projection 159 is taller than and normal to wall 157. String 130 is looped around projection 159 and thus remains behind projection 159, in the portion of central cavity 115 defined by projection 159, wall 157 and the interior surface of male section 132.

Turning now to male bead section 132, interior walls 186 extend from the interior surface of the top of section 132. Walls 186 are normal to the longitudinal axis of section 132, and spaced inwardly from the respective ends of the section to fit between wall 157 and wall 155 when the bead is assembled. More specifically, wall 186 is inward of and adjacent to channel 164 (described below). As best seen in FIG. 12 wall 186 extends below channel sidewalls 187 and 189. Wall 186 is spaced within section 132 a sufficient amount that, when bead 120 is assembled, wall 186 is interposed between walls 155, 157 and the space between walls 186 and 155, as well as walls 186 and 157, is less than the diameter of string 130. Thus the strands of string 130 are forced from a straight path through central cavity 115, down into the space between walls 155 and 157, where the strands are squeezed therebetween as described above for the embodiment of FIGS. 1-4.

As best seen in FIG. 9, the longitudinal rim 162 of male bead section 132 has ridges 139 which are adapted to seal with longitudinal rim 142 (FIG. 10) of female section 122. As best seen in FIG. 12, extending from the endwalls of section 132, channel closure member 180 has finger 183, arranged to extend toward the base of channel 150, and recesses 182, 184, arranged to be mutually engageable, respectively, with the top of endwall 170. Finger 183 of member 180 is arranged, when bead 120 is assembled, to engage with channel 150 and define an opening for bead 120 sized to receive and grip two diameters of string 130.

As best seen in FIGS. 8 and 9, a channel 164 extends transversely within the interior of section 132 directly behind and adjacent to channel closure member 180, sized to receive two diameters of string 130. Channel 164 is defined by sidewalls 187, 189 and a top 188 which spans between walls 187 and 189. Top 188 is coplanar with the end surface of finger 183. The bottoms of sidewalls 187 and 189 are adapted to lie on interior wall 155 of female section 122 when bead 120 is assembled.

III. Assembly

In assembling the string of teething beads of the first embodiment, one end of string 30 is passed twice through the openings of each teething bead 16 and apertures 24, 34 of sections 22, 32. In this way, all beads 16 and sections 22, 32 are on a double loop of string so that, should the string break or the knot untie, string 30 is gripped at multiple locations along its length within closure bead 20, and the set of beads would not become separated easily. If the bond between the closure-bead sections should fail, the string would still be strung through the set of teething beads and each closure section, so that the beads and closure-bead sections would not become separated easily.

As seen in FIG. 1, the ends of string 30 are tied together between closure bead section 22, 32 in a fisherman's knot 40. Sections 22, 32 are pressed together with longitudinal ridges 29, 39 fitting into troughs 37, 27 respectively, and closure bead 20 is then sealed by ultrasonic bonding.

When sections 22 and 32 are pressed together, knot 40 is enclosed within central cavity 15 of the new bead 20, and the interior surfaces of sections 22, 32 grip string 30, forcing it along a tortuous path within the interior of closure bead 20. From aperture 34, the string is pressed downward by wall 26 which is between endwall 33 and channel member 38, and up through channel 31. It then passes through channel 21, up over wall 36 between endwall 23 and channel member 28, and down and out through aperture 24. Along its tortuous path through cavity 15, string 30 is squeezed between the various walls as described above. This squeezing prevents separation of the string and closure member, even if the knot should fail.

In assembling the second embodiment, a double strand of string 130 is again provided. String 130 is squeezed at multiple locations within bead 120. String 130 is tied in a fisherman's knot and flattened to form two end loops 134. The loops are then laced through the central tubes 118 of teething shapes 116. One loop 134 is then placed within channel 150 of endwall 170, on tops 175, 177, of transverse walls 155, 157, and around the far protrusion 159. String 130 is then positioned so that, as seen in FIG. 7, loop 134 rests upon the top 177 of opposite wall 157.

The other loop 134 is similarly placed within channel 150 of the opposite end wall 170, over top 175 of wall 155, above loop 134 on wall 157, and around the far projection 159. The string is pulled so that, as seen in FIG. 7, slack is removed from both portions of string 130 within the interior of female bead section 122. Sections 122, 132 are then pressed together, with finger 183 fitting into channel 150 and longitudinal ridges 139 fitting onto the longitudinal rim 142 of female section 122. Finally, closure bead 120 is sealed by ultrasonic bonding, which fuses ridges 139 to rim 142.

When sections 122, 132 are pressed together to define central cavity 115, knot 140 is encapsulated between protrusions 159, and string 130 is forced and squeezed at multiple points (i.e. between walls 186 and 155, and between walls 186 and 157) along a tortuous path within central cavity 115. String 130 is forced from a straight path through the bead, downward by walls 186, outward around projections 159 and backwards by being looped around projections 159. Specifically, string 130 is maintained within both channels 150 by fingers 183 and within both channels 164 by walls 155. String 130 is squeezed and pressed downward between walls 155 and 157 by walls 186, upward over walls 157, and around projections 159.

It can be seen from both embodiments, then, that enclosing a string's knot in the interior of a closure bead which forces the string along a tightly squeezed tortuous path, prevents separation of the closure and the string and dissipates the pulling forces normally felt on a knot, resulting in more stable knot. This minimizes the likelihood of bead ingestion by the child.

Other embodiments of this invention, which will be apparent to those skilled in the art, are within the scope of the following claims. For example, the term string as used in this application refers to any flexible elongated member that can be formed in a circle by joining its ends together. The string can be used to support charms, beads, or assorted shapes to form a child's toy.

I claim:

1. A closure body for a string comprising
two members joined together to define a central cavity for receiving and encapsulating a knotted portion of said string, and openings at opposite ends of said body for passage of said string into said cavity, said openings defining a longitudinal axis, and
a pair of generally parallel, generally planar walls, a first wall of said pair being positioned adjacent at least one said opening, and a second wall of said pair being spaced axially inwardly from said first wall, each said wall being positioned transverse to said axis and intersecting said axis, said walls being spaced apart a distance less than the diameter of said string so that said string is squeezed therebetween to prevent separation of said closure and said string, the walls of said wall pair extending from opposite body members.

2. The closure body of claim 1 wherein said string comprises a knot encapsulated within said cavity.

3. The closure body of claim 1 wherein a plurality of shapes are strung along said string.

4. The closure body of claim 1 wherein said body comprises two said wall pairs, and each said pair comprises a first wall adjacent one said opening and a second wall spaced axially inwardly from said first wall.

5. The closure body of claim 4 wherein both said second walls extend from one body member, and both said first walls extend from the other said body member.

6. The closure body of claim 4 wherein one said second wall and one said first wall extend from one said body member, and the other said second wall and the other said first wall extend from the other said body member.

7. The closure body of claim 3 wherein at least two strands of said string pass through each shape on said string.

8. The closure body of claim 7 wherein each said closure member defines one of said openings and at least two strands of said string pass through each said opening.

9. The closure body of claim 2 wherein said string is a continuous loop formed by a knot in a linear string and flattened to create double strands with two end loops, and each resultant end loop of said string is encapsulated within said central cavity along with said knot.

10. The closure body of claim 9 wherein said body has at least one post in said central cavity extending transverse to said axis for positioning said loop ends thereover, whereby said loop ends and said knot are confined within said central cavity.

11. The closure of claim 10 wherein two said posts are provided, and
a first said loop end extends through a first said closure opening and around the said post furthest from said first opening, and the second said loop end extends through a second said closure opening and around the other said post.

12. The closure of claim 3 wherein said body member has an exterior configuration similar to said shapes on said string.

13. A closure body for a string comprising
two members joined together to define a central cavity for receiving and encapsulating a portion of said string, and openings at opposite ends of said body for passage of said string into said cavity, said openings defining a longitudinal axis, and
two pairs of walls, each said wall pair comprising a first wall adjacent one said opening and a second wall spaced axially inwardly from said first wall, both said second walls extending from one body member, and both said first walls extending from the other said body member, each said wall pair extending transverse to said axis and being spaced apart a distance less than the diameter of said string so that said string is squeezed therebetween to prevent separation of said closure and said string.

14. A closure body for a string comprising two members joined together to define a central cavity for receiving and encapsulating a portion of said string, and openings at opposite ends of said body for passage of said string into said cavity, said openings defining a longitudinal axis, and a pair of walls adjacent at least one said opening, extending transverse to said axis and spaced apart a distance less than the diameter of said string so that said string is squeezed therebetween to prevent separation of said closure and said string, the walls of said wall pair extending from opposite body members, a plurality of shapes being strung along said string, at least two strands of said string passing through each said shape on said string, and each said closure member defining one of said openings, through which at least two strands of said string pass.

15. A closure body for a string comprising two members joined together to define a central cavity for receiving and encapsulating a portion of said string, and openings at opposite ends of said body for passage of said string into said cavity, said openings defining a longitudinal axis, and a pair of walls adjacent at least one said opening, extending transverse to said axis and spaced apart a distance less than the diameter of said string so that said string is squeezed therebetween to prevent separation of said closure and said string, the walls of said wall pair extending from opposite body members, said string being a continuous loop formed by a knot in a linear string and flattened to create double strands with two end loops, and each resultant end loop of said string being encapsulated within said central cavity along with said knot.

16. The closure body of claim 15 wherein said body has at least one post in said central cavity extending transverse to said axis for positioning said loop ends thereover, whereby said loop ends and said knot are confined within said central cavity.

17. The closure of claim 16 wherein two said posts are provided, and a first said loop end extends through a first said closure opening and around the said post furthest from said first opening, and the second said loop end extends through a second said closure opening and around the other said post.

* * * * *